(12) United States Patent
Sato et al.

(10) Patent No.: US 9,483,042 B2
(45) Date of Patent: Nov. 1, 2016

(54) LOAD DISPLAY DEVICE FOR MACHINE TOOL

(71) Applicant: FANUC Corporation, Minamitsuru-gun, Yamanashi (JP)

(72) Inventors: Kazuo Sato, Yamanashi (JP); Yamato Iwamura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 415 days.

(21) Appl. No.: 14/138,230

(22) Filed: Dec. 23, 2013

(65) Prior Publication Data

US 2014/0180467 A1 Jun. 26, 2014

(30) Foreign Application Priority Data

Dec. 25, 2012 (JP) ................... 2012-281594

(51) Int. Cl.
*G05B 19/18* (2006.01)
*G05B 19/4062* (2006.01)

(52) U.S. Cl.
CPC ........... *G05B 19/18* (2013.01); *G05B 19/4062* (2013.01); *G05B 2219/35327* (2013.01)

(58) Field of Classification Search
None
See application file for complete search history.

(56) References Cited

U.S. PATENT DOCUMENTS

| | | | |
|---|---|---|---|
| 5,317,518 A * | 5/1994 | Fujita .................. | B23Q 1/0009 700/175 |
| 5,471,394 A * | 11/1995 | Matsumura ........ | G05B 19/4069 700/180 |
| 5,663,886 A * | 9/1997 | Lueck ................ | G05B 19/4069 700/180 |
| 6,384,560 B1 | 5/2002 | Kakino et al. | |
| 6,621,032 B1 * | 9/2003 | Katou ..................... | B23H 7/02 219/69.12 |
| 7,047,102 B2 * | 5/2006 | Ikeda ................ | G05B 19/40937 700/172 |
| 8,190,287 B2 * | 5/2012 | Iwashita ............ | G05B 19/4097 318/565 |
| 2004/0128019 A1 | 7/2004 | Ikeda et al. | |
| 2011/0015877 A1 | 1/2011 | Okita et al. | |

FOREIGN PATENT DOCUMENTS

| | | |
|---|---|---|
| CN | 2491849 Y | 5/2002 |
| CN | 101699359 A | 4/2010 |
| EP | 0663257 A2 | 7/1995 |
| JP | 6260005 A | 3/1987 |
| JP | 5-324043 A | 12/1993 |
| JP | 7204942 A | 8/1995 |
| JP | 11224116 A | 8/1999 |

(Continued)

OTHER PUBLICATIONS

Office Action mailed Jul. 1, 2014, corresponds to Japanese patent application No. 2012-281594.

(Continued)

*Primary Examiner* — Christopher E Everett
(74) *Attorney, Agent, or Firm* — Hauptman Ham, LLP

(57) ABSTRACT

A load display device for a machine tool acquires machine coordinate values and load values for axes of the machine tool for each predetermined time from an axis drive control unit for drivingly controlling the machine tool. Three-dimensional coordinate values of a tool center point is calculated to obtain a tool trajectory, based on the machine coordinate values for the axes acquired for each predetermined time and information on a configuration of the machine tool. As the tool trajectory is displayed by a display device, vectors of the load values for the axes stored for each predetermined time are displayed.

6 Claims, 9 Drawing Sheets

(56) References Cited

FOREIGN PATENT DOCUMENTS

| JP | 2000-84797 A | 3/2000 |
| JP | 2003223205 A | 8/2003 |
| JP | 2003330512 A | 11/2003 |
| JP | 200421953 A | 1/2004 |
| JP | 200421954 A | 1/2004 |
| JP | 2004164328 A | 6/2004 |
| JP | 20089637 A | 1/2008 |
| JP | 4087374 B2 | 5/2008 |
| JP | 2009116745 A | 5/2009 |
| JP | 2011022688 A | 2/2011 |
| JP | 4648471 B2 | 3/2011 |

OTHER PUBLICATIONS

Office Action in CN Application No. 201310726391.0, dated Apr. 5, 2016.

* cited by examiner

LOAD DISPLAY DEVICE FOR MACHINE TOOL

RELATED APPLICATIONS

The present application claims priority to Japanese Application Number 2012-281594 filed Dec. 25, 2012, the disclosure of which is hereby incorporated by reference herein in its entirety.

BACKGROUND OF THE INVENTION

1. Field of the Invention

The present invention relates to a load display device for a machine tool, configured to simultaneously display the sizes and directions of loads on axes of a machine tool, in the form of vectors, on a tool trajectory during machining displayed on a display screen, thereby enabling visual recognition of changes in size and direction of loads on a tool path.

2. Description of the Related Art

In a numerical controller having a machine state monitoring function, the state of the numerical controller can be recorded at an arbitrary timing during operation of a machining program. If an abnormal load on a motor is detected in a numerical controller capable of monitoring a machine state, the machine state at that time is recorded to be used to clear up the cause of the abnormal load.

Japanese Patent Application Laid-Open No. 2011-22688 discloses a method of displaying the position of a tool center point in association with a position error during machining. In this method, a corresponding point between a tool trajectory and a time-base position of waveform data for each axis is visually captured. Further, Japanese Patent Application Laid-Open No. 2009-116745 discloses a method of using load information, in which a simulation of machining is displayed in association with the load information.

In some cases, a machine or workpiece may be damaged as a spindle is impacted during machining by means of the numerical controller. To investigate the cause, the state of the machine should be checked based on machine state monitoring. However, actual occurrence of an incidence cannot be easily recognized by only displaying instantaneous numerical values indicative of the state of the machine, so that it is difficult to locate the cause. Even if the machine state is displayed in time series, on the other hand, it is hard to grasp the details of the machining based on this data alone.

SUMMARY OF THE INVENTION

Proposed in Japanese Patent Application Laid-Open No. 2011-22688 described above is the method of displaying coordinates in association with machine information, in which a three-dimensional tool trajectory of the tool center point is displayed in association with position error data and torque command. The information handled here includes only the data on the coordinates of the tool and the torque command and is not representative of the direction and size of a force applied to a spindle. In the technique disclosed in Japanese Patent Application Laid-Open No. 2009-116745 described above, moreover, the load information is represented as a numerical value and is not representative of the direction of application of a force.

Accordingly, in view of the above problems of the prior art described above, the object of the present invention is to provide a load display device for a machine tool, having the function of displaying the sizes and directions of loads in the form of vectors on a tool trajectory during machining displayed on a display screen, thereby enabling visual recognition of changes in size and direction of loads on a tool path such that the cause of the abnormal load and the location where an abnormal load was detected can be easily located.

The present invention relates to a load display device for a machine tool. The machine tool executes a machining program to drive axes, thereby moving a tool relative to a workpiece. The load display device is configured to display a load on the machine tool and comprises a data acquisition unit configured to acquire and store machine coordinate values and load values for the axes of the machine tool, a tool trajectory display unit configured to calculate three-dimensional coordinate values of a tool center point, based on the machine coordinate values for each predetermined time acquired by the data acquisition unit and information on a configuration of the machine tool, and display a tool trajectory, and a load display unit configured to display the load values for the axes stored in the data acquisition unit for each predetermined time, in the form of vectors, on the tool trajectory displayed by the tool trajectory display unit.

The machine tool may be a multi-axis machine configured to perform machining with the position and orientation of the tool relative to the workpiece on a table controlled by means of three orthogonal linear axes and two rotational axes, and the load display unit may be configured to display the tool trajectory and the load values in the form of vectors in a table coordinate system defined on the table.

The load values displayed by the load display unit may be load current values for the axes of the machine tool.

The load values displayed by the load display unit may be vibration values for the directions of three axes of a spindle of the machine tool acquired by a shock sensor attached to the spindle.

The load display unit may be configured to display a synthetic vector of the load values for the axes.

The tool trajectory display unit may be configured to change the color of the tool trajectory depending on the size of the load values or a change of the angle of the synthetic vector of the load values.

The load display device may be a display device of a numerical controller for controlling the machine tool.

The load display device may be a display device of a personal computer.

The data acquisition unit may be configured to acquire a block number of a running program along with coordinate values and load values for the axes, and the load display unit may be configured to display, along with the vector, the block number corresponding to the vector.

The load display device according to the present invention, having the configuration described above, is configured to display the sizes and directions of loads in the form of vectors on a tool trajectory during machining displayed on a display screen, thereby enabling visual recognition of changes in size and direction of loads on a tool path such that the cause and location of an abnormal load, if any, during the machining can be located accurately and quickly and that whether or not an abnormal load is applied to a spindle can be easily determined in case where the machining is deficient in accuracy.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
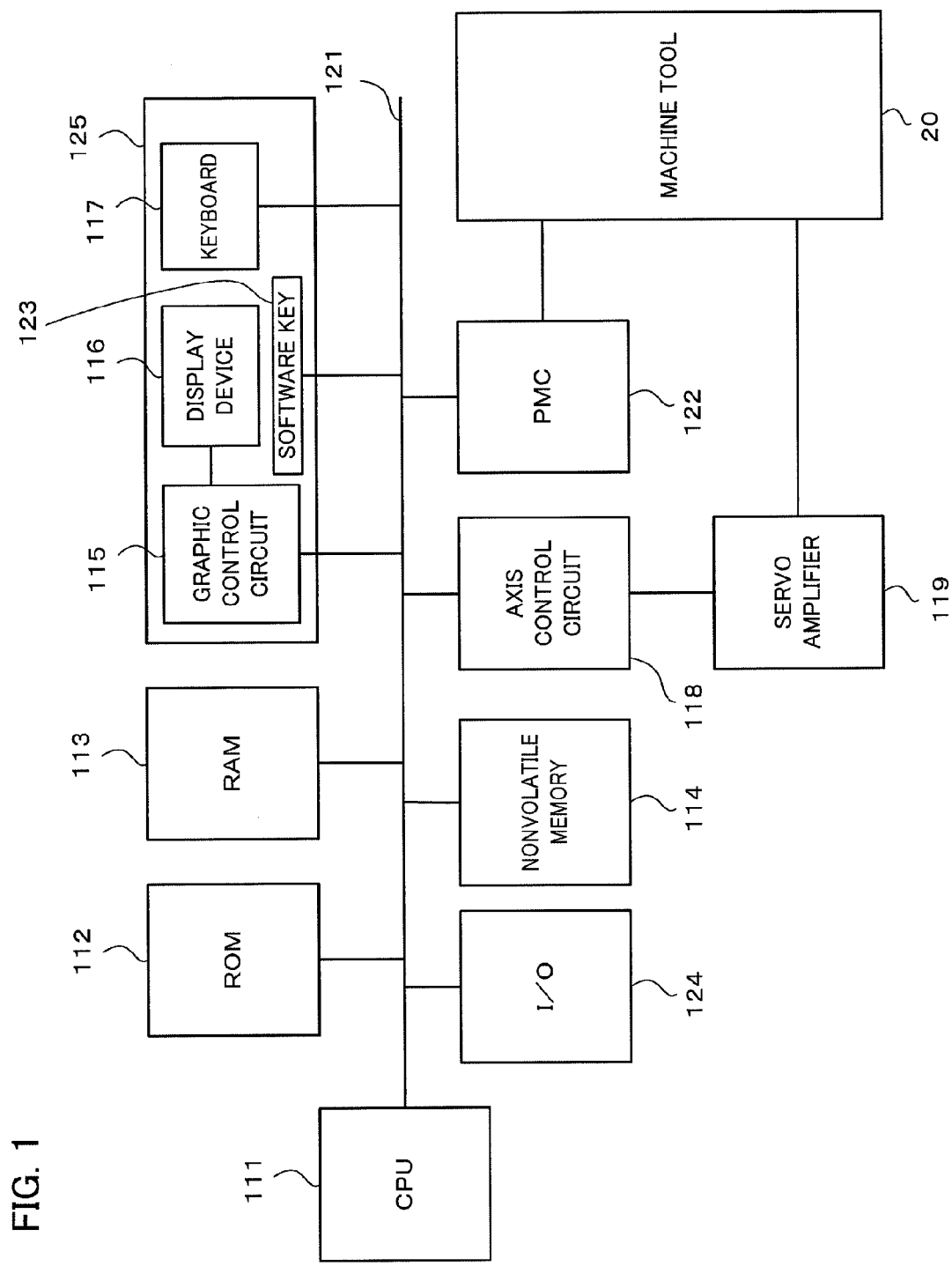
FIG. 1 is a block diagram schematically showing a configuration of a numerical controller constituting a load display device for a machine tool according to the present invention and configured to control the machine tool.

A load display device for a machine tool according to the present invention can be formed of a numerical controller for controlling the machine tool. The configuration of the numerical controller will now be described with reference to the block diagram of FIG. 1.

A CPU 111 for use as a processor controls a numerical controller 10 in accordance with system programs stored in a ROM 112. Various data and input/output signals are stored in a RAM 113. Various data, including position data, speed data, acceleration data, position errors, torque commands, load current values, and vibration values, which will be described later, are time-sequentially stored in a nonvolatile memory 114 in accordance with time information on the acquisition of these data. The various data stored in the nonvolatile memory 114 are maintained without change even after the power supply is cut off.

A graphic control circuit 115 converts a digital signal to a signal for display and applies it to a display device 116. A keyboard 117 comprises numeric keys, letter keys, etc., for inputting various set data. The CPU 111 processes the various data described above, thereby displaying the trajectory of a tool attached to a machine tool 20 and the above-described data corresponding to the trajectory on the display device 116.

An axis control circuit 118 receives a move command for each axis of the machine tool from the CPU 111 and outputs the axis command to a servo amplifier 119. On receiving the move command from the axis control circuit 118, the servo amplifier 119 drives servomotors 21 located in the machine tool 20. These constituent elements are connected to one another by a bus 121. Position detectors 22 are individually built in the servomotors 21, which drive feed shafts in the machine tool 20. Position detection signals detected by the position detectors 22 are output as position feedback signals to the axis control circuit 118 through a signal path (not shown).

A programmable machine controller (PMC) 122 receives a T-function signal (tool selection command) and the like through the bus 121 during the execution of a machining program. This signal is processed according to a sequential program and output as an operation command, which is used to control the machine tool 20. On receiving a status signal from the machine tool 20, moreover, the PMC 122 transfers a necessary input signal to the CPU 111.

Further, the bus 121 is connected with a software key 123, whose function is variable by the system programs, and an interface 124 that transmits NC data to a storage device or the like. The software key 123, along with the display device 116 and the keyboard 117, is provided on a display/MDI panel 125.

Figure 2:
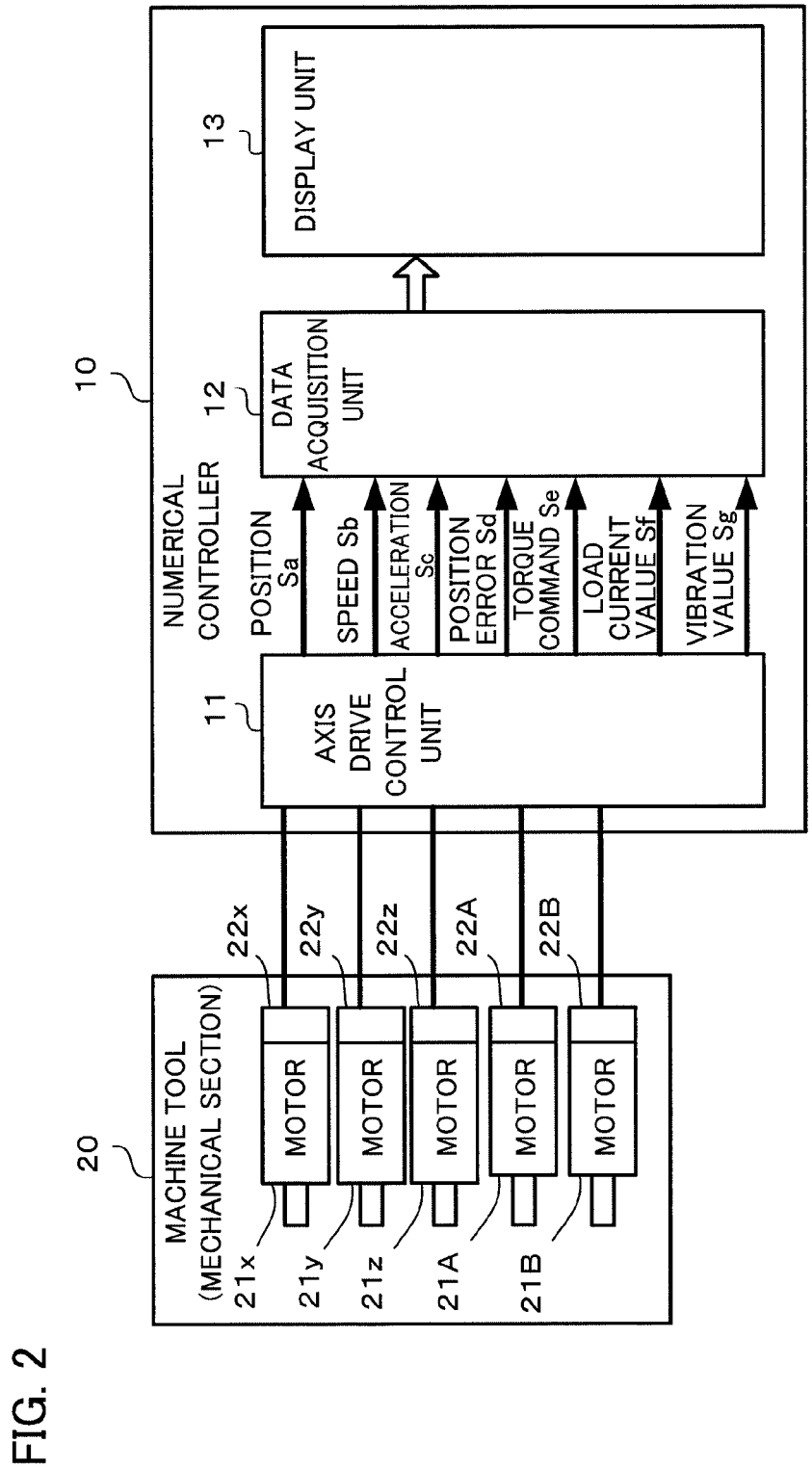
FIG. 2 is a diagram illustrating a first embodiment of the load display device for the machine tool according to the present invention, configured so that a tool trajectory display function of the load display device for the machine tool is performed by a display unit attached to the numerical controller for controlling the machine tool.

FIG. 2 is a diagram illustrating a first embodiment of the load display device for a machine tool according to the present invention. A tool trajectory display function of the load display device is performed by a display unit attached to a numerical controller for controlling the machine tool.

As shown in FIG. 2, the numerical controller 10 comprises an axis drive control unit 11, data acquisition unit 12, and display unit 13. The machine tool 20 comprises servomotors 21x, 21y, 21z, 21A and 21B configured to drive axes (X-, Y-, Z-, A-, and B-axes). The servo amplifier (not shown) is controlled by a torque command from the axis drive control unit 11 of the numerical controller 10, and the servomotors 21x, 21y, 21z, 21A and 21B are driven by the servo amplifier.

Furthermore, the servomotors 21x, 21y, 21z, 21A and 21B are provided with position detectors 22x, 22y, 22z, 22A and 22B, respectively, and position data on the servomotors 21x, 21y, 21z, 21A and 21B are fed back from the position detectors 22x, 22y, 22z, 22A and 22B to the axis drive control unit 11. Of these servomotors, the servomotors 21x, 21y and 21z serve for orthogonal linear axes, and the servomotors 22A and 22B for rotational axes.

The axis drive control unit 11 calculates speed data Sb, acceleration data Sc, and a torque command Se for each drive axis, based on a move command issued by a numerical control unit (not shown) for analyzing and processing the machining program of the numerical controller 10 and position data Sa fed back from the servomotors 21, and acquires a load current value Sf for the servo amplifier (not shown) and a vibration value Sg from a shock sensor (not shown) attached to each spindle motor. These calculated and acquired data, along with the fed-back position data Sa, are output to the data acquisition unit 12. Since the position data Sa, speed data Sb, acceleration data Sc, torque command Se, load current value Sf, and vibration value Sg are data that have conventionally been calculated or acquired in a numerical controller for controlling a machine tool, a description of methods for calculating or acquiring those data or values is omitted.

The data acquisition unit 12 simultaneously acquires the data from the axis drive control unit 11 for each time. Further, the data acquisition unit 12 may be configured to acquire a block number during the execution of the machining program acquirable in the numerical controller 10, as well as to simultaneously acquire the data from the axis drive control unit 11 for each time. The acquired data are recorded on a memory (not shown). The display unit 13 may be configured to display a three-dimensional movement locus (tool trajectory) of the tool center point, together with each axis vector or synthetic vector of the load current values of the orthogonal linear axes (X-, Y-, and Z-axes) and/or each axis vector or synthetic vector of the vibration values of the orthogonal linear axes, based on the data acquired by the data acquisition unit 12. Further, the display unit 13 may be configured to display a block number corresponding to the tool trajectory, besides the tool trajectory and each axis vector or synthetic vector.

The machine tool 20 is a multi-axis machine that performs machining with the position and orientation of the tool relative to a workpiece on a table (not shown) controlled by means of the three orthogonal linear axes (X-, Y-, and Z-axes) and two rotational axes (A- and B-axes). The display unit 13 displays the trajectory of the tool center point and the coordinate-system vectors of the load values in a table coordinate system defined on the table.

Figure 3:
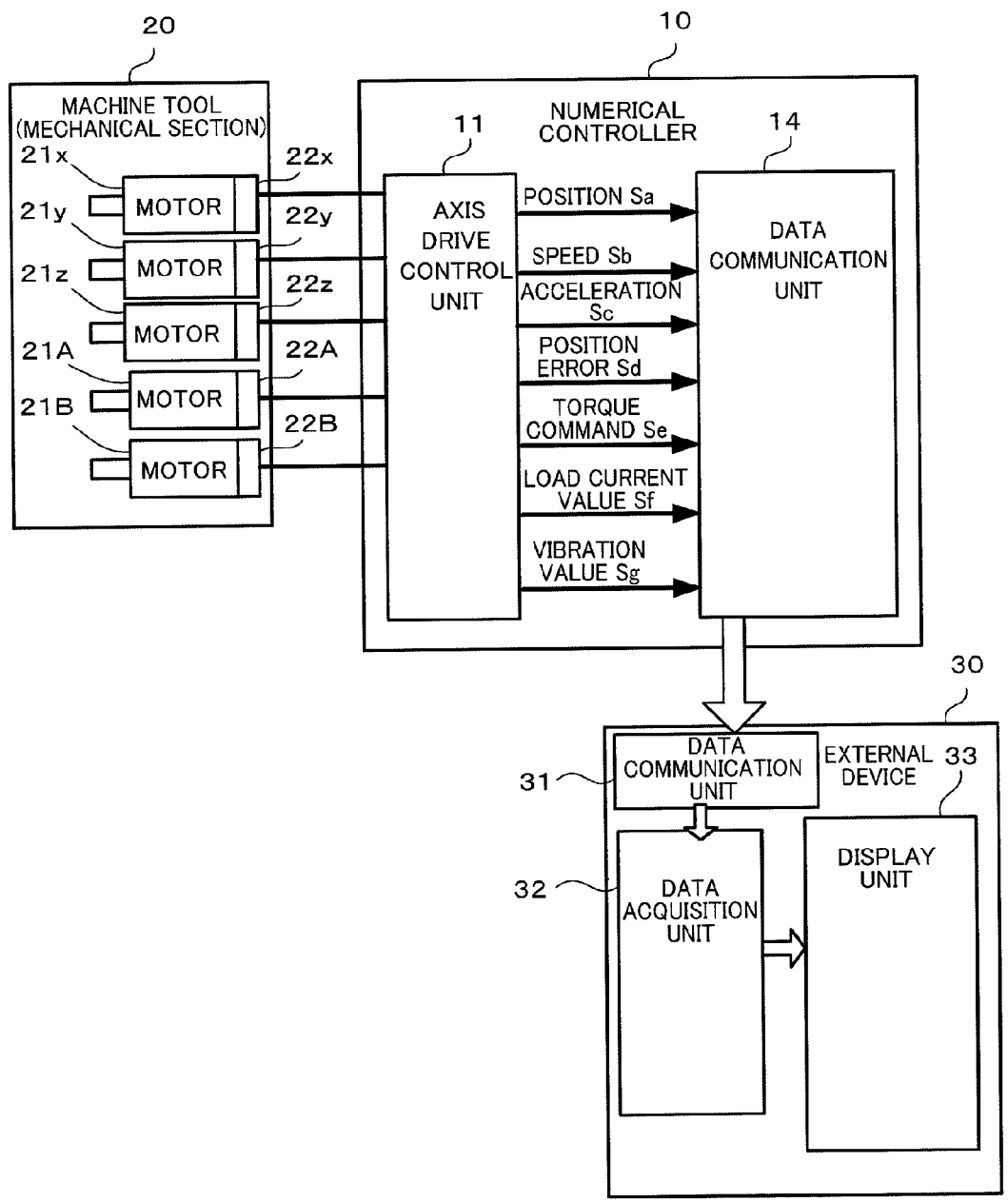
FIG. 3 is a diagram illustrating a second embodiment of the load display device for the machine tool according to the present invention, configured so that the tool trajectory display function of the load display device for the machine tool is performed by an external device connected to the numerical controller for controlling the machine tool.

FIG. 3 is a diagram illustrating a second embodiment of the load display device for a machine tool according to the present invention. A tool trajectory display function of the load display device is performed by an external device connected to a numerical controller for controlling the machine tool.

The numerical controller 10 comprises an axis drive control unit 11 and a data communication unit 14. An external device 30 comprises a data communication unit 31, data acquisition unit 32, and display unit 33. For example, the external device 30 is a personal computer. The trajectory of a tool and load values for axes are displayed by a display device of the personal computer.

Figure 4:
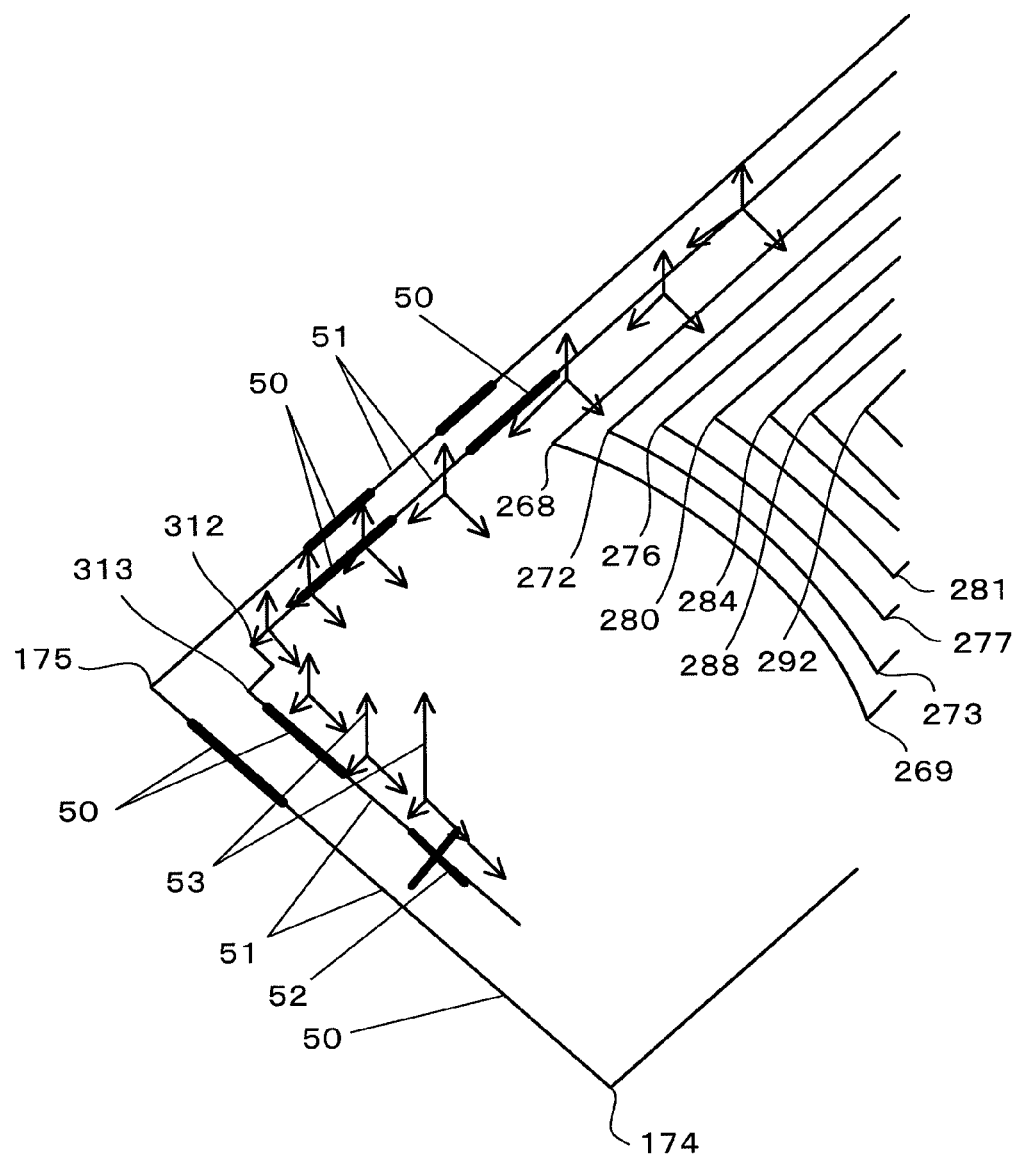
FIG. 4 shows a display example of a tool trajectory displayed by the display device of FIG. 1, block numbers corresponding to the tool trajectory, and load vectors of orthogonal linear axes obtained from drive axes.

FIG. 4 shows a display example of the tool trajectory displayed by the display device 116 of FIG. 1, block numbers corresponding to the tool trajectory, and load vectors of orthogonal linear axes obtained from drive axes. In this display example, load vectors of load current values for the axes are three-dimensionally displayed together with the tool trajectory based on an XYZ-coordinate system. Three-digit numbers (174, 175, 268, 269, 272, 273, 276, 277, 280, 281, 284, 288, 292, 312 and 313) on the tool trajectory are block numbers at end points.

Figure 5:
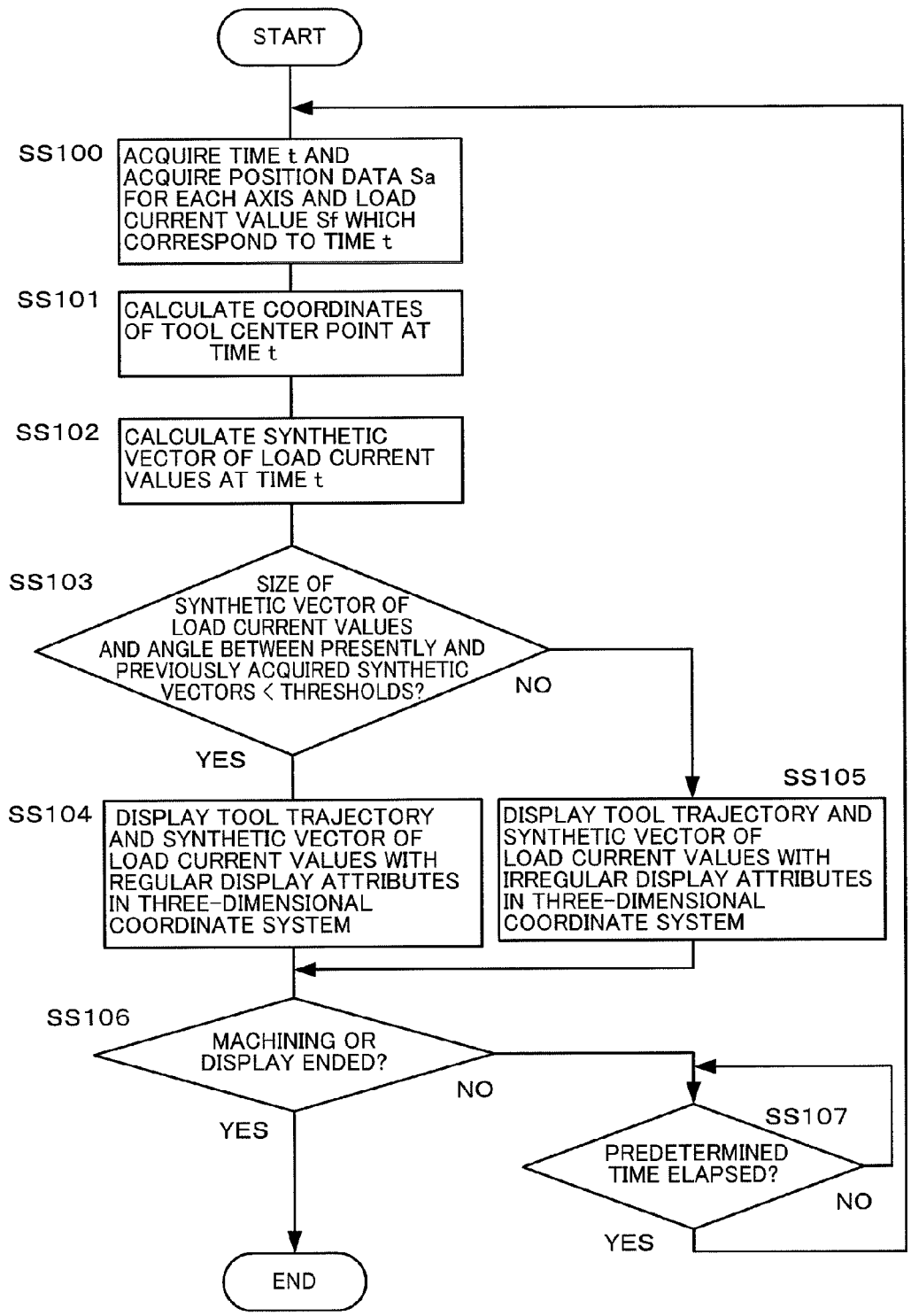
FIG. 5 is a flowchart showing an algorithm of display processing performed by the load display device for the machine tool according to the present invention, in which display attributes of the tool trajectory are changed when a set threshold is exceeded by the size of a synthetic vector of load current values.
Figure 6:
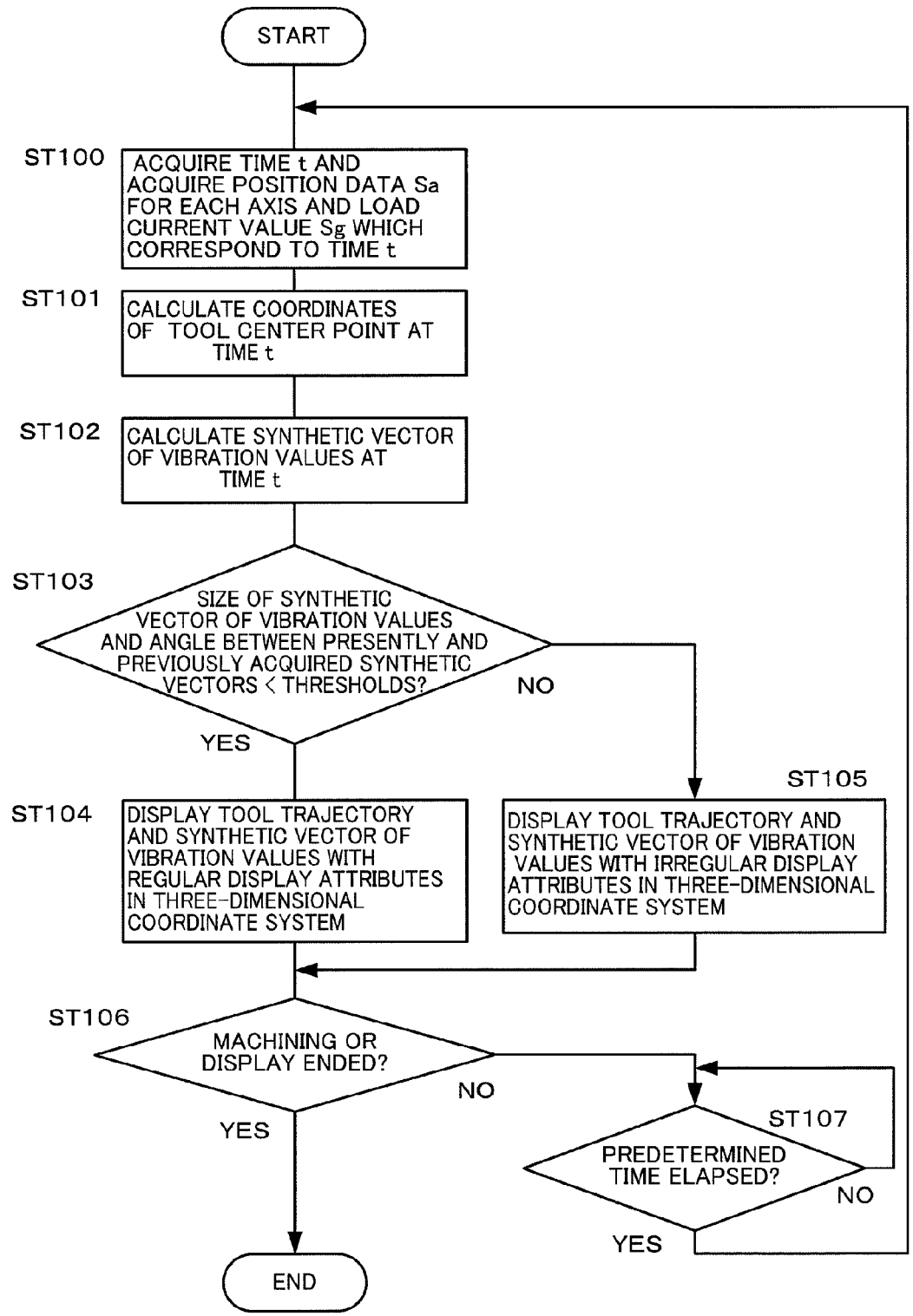
FIG. 6 is a flowchart showing an algorithm of display processing performed by the load display device for the machine tool according to the present invention, in which display attributes are selected based on vibration values.

For the load current values and/or vibration values for the orthogonal linear axes, one embodiment of the present invention has a function to change display attributes (color, thickness, and background color) of the synthetic vectors and the tool trajectory, depending on the sizes of the load vectors and the angle between presently and previously acquired synthetic vectors (see processing shown in the flowchart of FIG. 5 or 6). Thus, those parts of the tool trajectory where abnormal loads are generated can be easily visually recognized if the display attributes are changed depending on the conditions.

In FIG. 4, reference numerals 50, 51, 52 and 53 designate colors of lines. Reference numeral 50 designates a blue color for a light load, Reference numeral 51 designates a light blue color for a medium load, reference numeral 52 designate a yellow color for a moderately heavy load, and reference numeral 53 designate a red color for a heavy load.

The following is a description of a method of calculating the load current values as thresholds to determine the display attributes with which the synthetic vectors and the tool trajectory are displayed by the display device.

<Load Current Value>

Let us consider a machining device having orthogonal linear axes as its X-, Y-, and Z-axes. The coordinates of these three axes at a time t are given by x(t), y(t) and z(t), and load current values for the axes are given by Fx(t), Fy(t) and Fz(t), individually. A synthetic vector F(t) of load current values for a spindle is given by equation (1) as follows:

$$F(t) = \begin{pmatrix} Fx(t) \\ Fy(t) \\ Fz(t) \end{pmatrix} \quad (1)$$

whereby the load current values for the spindle can be calculated.

FIG. 5 is a flowchart showing an algorithm of display processing performed by the load display device for the machine tool according to the present invention.

In the processing shown in the flowchart of FIG. 5, the display attributes of the tool trajectory are changed when a set threshold is exceeded by the size of the synthetic vector of the load current values (or the angle between this synthetic vector and the previously acquired synthetic vector). In this processing, machining of the workpiece is started by, for example, the machine tool 20, which is controlled by the numerical controller 10, and execution is started as time-series data are allowed to be acquired. The following is a sequential description of steps of the processing.

[Step SS100] The time t, position data Sa for each axis and load current value Sf which are corresponding to the time t are acquired.

[Step SS101] The three-dimensional coordinates of the tool center point at the time t are calculated.

[Step SS102] The synthetic vector of the load current values at the time t is calculated.

[Step SS103] It is determined whether or not the size of the synthetic vector of the load current values or the angle between this synthetic vector and the previously acquired synthetic vector is smaller than preset thresholds. If the size or angle is smaller than the thresholds, the program proceeds to Step SS104. If not, the program proceeds to Step SS105.

[Step SS104] The tool trajectory and the synthetic vector of the load current values are displayed with regular display attributes in a three-dimensional coordinate system.

[Step SS105] The tool trajectory and the synthetic vector of the load current values are displayed with irregular display attributes in the three-dimensional coordinate system.

[Step SS106] It is determined whether the machining of the workpiece by the machining device is ended or if there is a display end signal. If the decision is YES, the processing is ended. If not, the program proceeds to Step SS107.

[Step SS107] The passage of a predetermined time for the display on the display device is awaited. If the passage of the predetermined time is detected, the program returns to Step SS100, whereupon the processing is continued.

The following is a description of an embodiment in which it is determined whether or not, in determination of display attributes with which the tool trajectory is displayed by the display device, the display attributes are to be changed by comparing the change in the angle of the synthetic vectors (angle between the presently and previously acquired synthetic vectors of the load current values) with preset thresholds.

<Angle Between Synthetic Vectors>

Let us assume that the time directly preceding the time t is t'. Thereupon, a synthetic vector F(t') at the time t' can be given by equation (2) as follows:

$$F(t') = \begin{pmatrix} Fx(t') \\ Fy(t') \\ Fz(t') \end{pmatrix} \quad (2)$$

If the angle between the synthetic vector F(t) (see equation (1)) at the time t and the synthetic vector F(t') at the time t' is θ, equation (3) holds as follows:

$$\cos\theta = \frac{F(t) \cdot F(t')}{|F(t)||F(t')|} \quad (3)$$

FIG. 6 is a flowchart showing an algorithm of display processing performed by the load display device for the machine tool according to the present invention, in which display attributes are selected based on vibration values. The vibration values are advantageous in that direct data obtained in a shocked state are available.

The following is a description of only the difference between the processing shown in the flowchart of FIG. 6 and that shown in the flowchart of FIG. 5.

In Step ST100, a vibration value Sg is acquired together with position data Sa. In Step ST102, a synthetic vector of vibration values in the X-, Y-, and Z-axis directions for the spindle acquired in Step ST100 is calculated. Then, in Step ST103, the size of the synthetic vector calculated in Step ST102 or the angle between presently and previously acquired synthetic vectors of the vibration values are compared with the preset thresholds.

Figure 7:
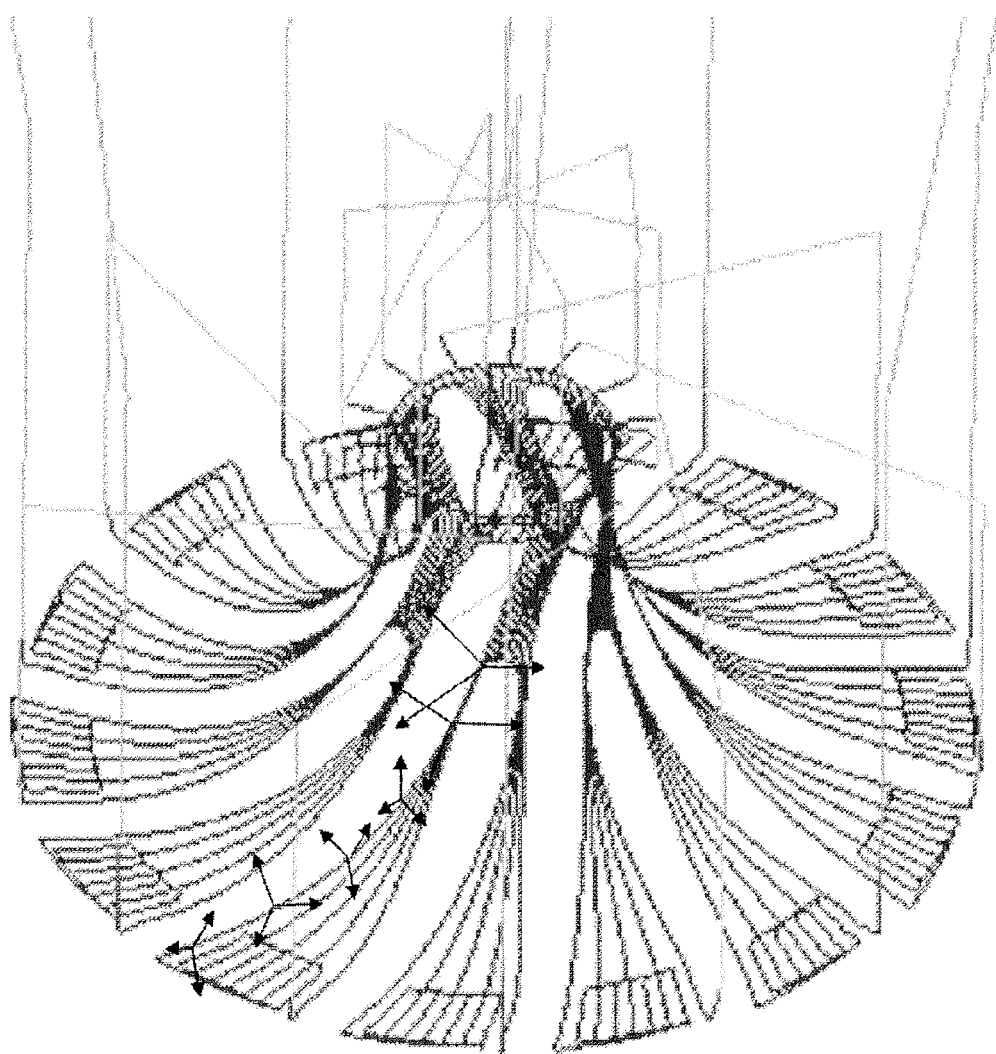
FIG. 7 is a diagram showing a display example of the tool trajectory and coordinate-system vectors of load current values for the orthogonal linear axes displayed by the display device of FIG. 1.

FIG. 7 shows a display example of the tool trajectory and coordinate-system vectors of load current values for the orthogonal linear axes (drive axes) displayed by the display device 116 of FIG. 1. The coordinate-system vectors of load current values displayed here directly indicate the sizes and directions of loads acting on the individual motors for the three orthogonal linear axes. Thus, (X_t, Y_t, Z_t) at one time t and (X_t', Y_t', Z_t') at another time t' are different in vector orientation. Although there exist the rotational axes for machining, information on loads on the rotational axes is not displayed.

Figure 8:
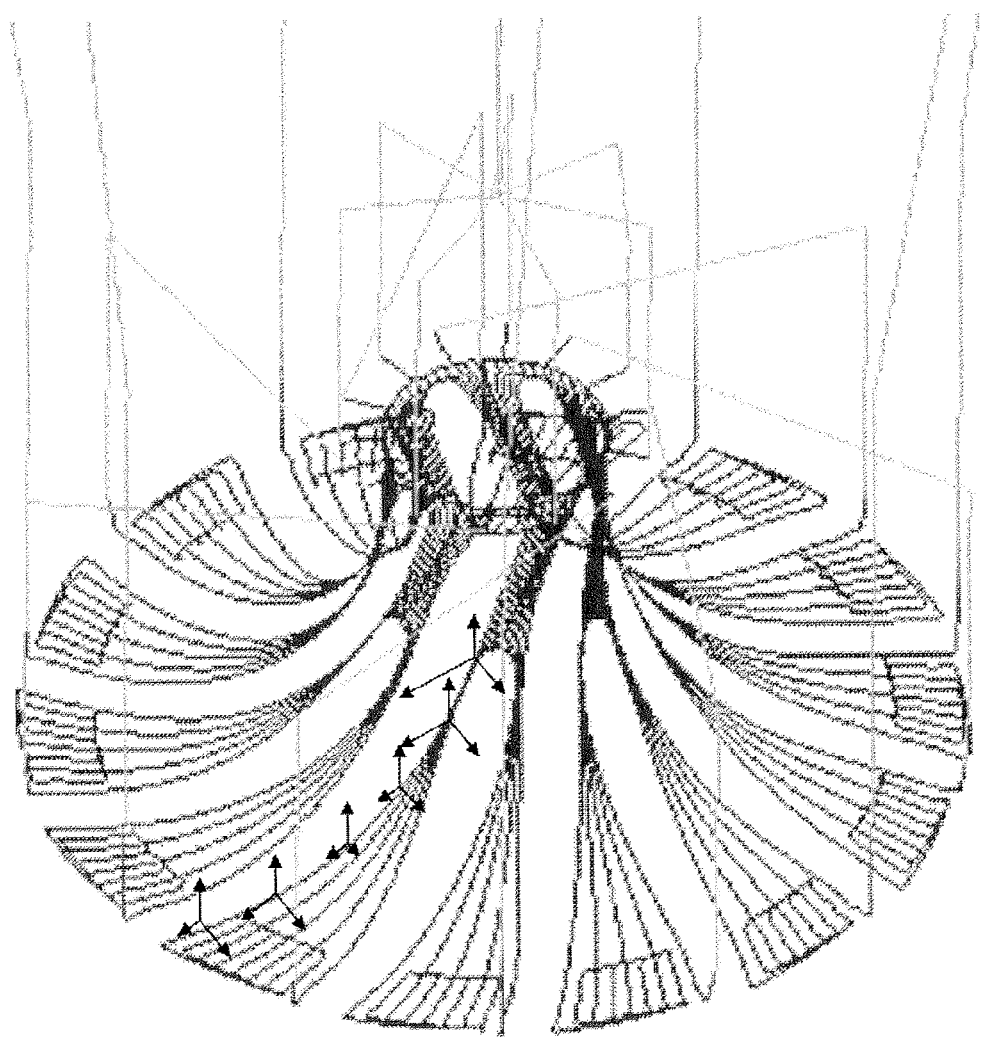
FIG. 8 is a diagram showing a display example of the tool trajectory and vectors of the load current values for the orthogonal linear axes displayed by the display device of FIG. 1.

FIG. 8 shows a display example of the tool trajectory and vectors of the load current values for the orthogonal linear axes (drive axes) displayed by the display device 116 of FIG. 1. The vectors of the load current values for the orthogonal linear axes displayed here are the sums of loads as vector quantities for the axes that are converted into a predetermined coordinate system (X, Y, Z) and added together for each combination of X-, Y-, and Z-axes. Although there exist the rotational axes for machining, information on loads on the rotational axes is not displayed.

Figure 9:
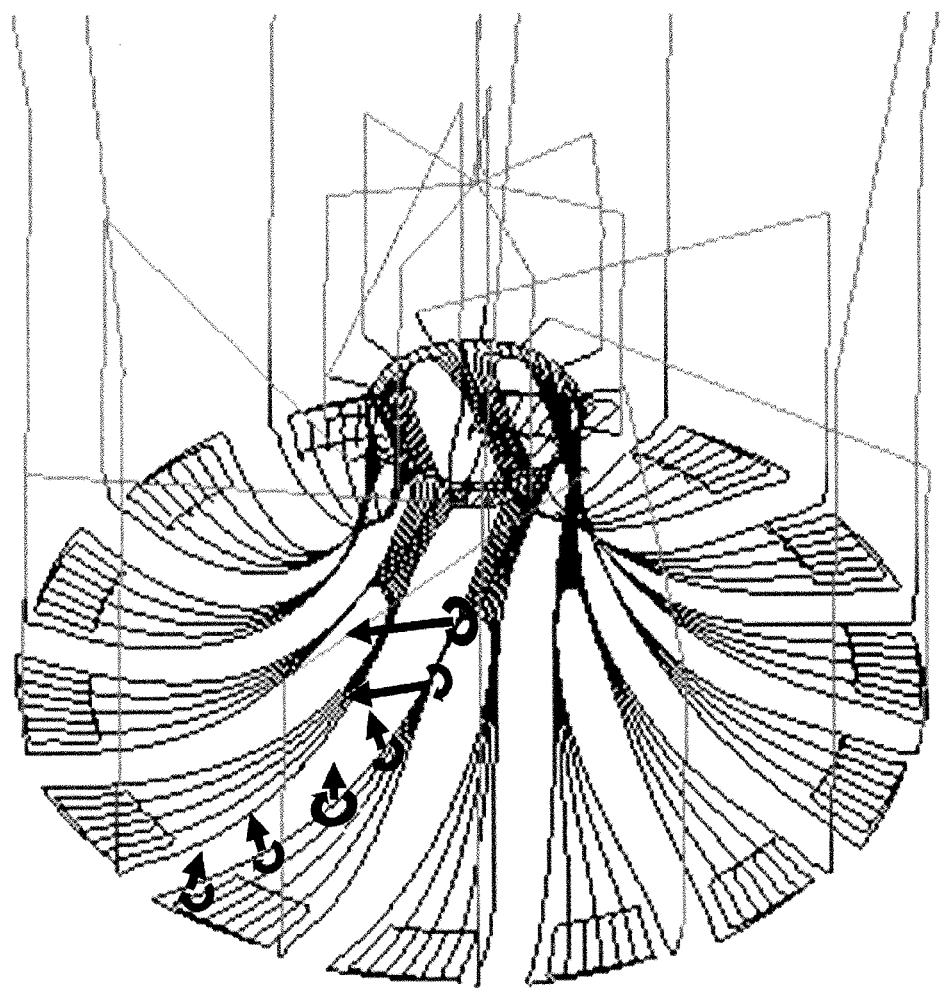
FIG. 9 is a diagram showing a display example of the tool trajectory, synthetic vectors of the load current values for the orthogonal linear axes, and load current values for rotational axes displayed by the display device of FIG. 1.

FIG. 9 shows a display example of the tool trajectory, synthetic vectors of the load current values for the orthogonal linear axes, and load current values for the rotational axes displayed by the display device 116 of FIG. 1. In this case, the synthetic vectors of the load current values for the orthogonal linear axes are three-dimensionally displayed together with the tool trajectory based on an XYZ-coordinate system, and the load current values for the rotational axes are represented by circular arrows, individually. The synthetic vectors of the load current values for the orthogonal linear axes displayed here are obtained by synthesizing the loads as vector quantities for the orthogonal linear axes.

A tool trajectory X(t) at the time t is calculated by equation (4), based on machine coordinate values x(t), y(t) and z(t) for the orthogonal linear axes and coordinate values α(t) and β(t) for the rotational axes, as follows:

$$X(t) = Rot(\beta(t)) \cdot Rot(\alpha(t)) \cdot \begin{pmatrix} x(t) \\ y(t) \\ z(t) \end{pmatrix} = \quad (4)$$

$$\begin{pmatrix} \cos\alpha(t) & \sin\alpha(t) & 0 \\ -\sin\alpha(t)\cos\beta(t) & \cos\alpha(t)\cos\beta(t) & \sin\beta(t) \\ \sin\alpha(t)\sin\beta(t) & -\cos\alpha(t)\sin\beta(t) & \cos\beta(t) \end{pmatrix} \cdot \begin{pmatrix} x(t) \\ y(t) \\ z(t) \end{pmatrix}$$

For the load current values and/or vibration values for the orthogonal linear axes, one embodiment of the present invention has a function to change the display attributes (color, thickness, and background color) depending on the sizes of the vectors or the angle between presently and previously acquired synthetic vectors. For the load current values and/or vibration values for the rotational axes, moreover, the embodiment has a function to change the display attributes (color, thickness, and background color) depending on the difference between the sizes of the presently and previously acquired synthetic vectors. Thus, the types of generated forces and those parts of the tool trajectory where the forces are generated can be easily visually recognized if the display attributes are changed depending on the conditions.

The invention claimed is:

1. A load display device for a multi-axis machine, wherein
    the multi-axis machine has three linear axes for controlling a position of a tool with respect to a workpiece on a table and two rotational axes in an order of proximity to the table from the tool, and
    the multi-axis machine is configured to execute a machining program to drive the three linear axes and the two rotational axes, thereby controlling the position and an orientation of the tool relative to the workpiece, and perform machining on the workpiece,
    the load display device comprising:
        a data acquisition unit configured to acquire and store machine coordinate values and load values of the three linear axes and the two rotational axes for each predetermined time;
        a tool trajectory display unit configured to calculate three-dimensional coordinate values of a tool center point of the tool, based on the machine coordinate values for each said predetermined time acquired by the data acquisition unit and information on a configuration of the multi-axis machine, and display a tool trajectory of the tool center point; and
        a load display unit configured to display the load values for the three linear axes and the two rotational axes stored in the data acquisition unit for each said predetermined time, in a form of vectors of load current values for the three linear axes and the two rotational axes or vectors of vibration values for directions of three axes of a spindle acquired by a shock sensor attached to the spindle;
wherein the load display unit
generates, regarding the load current values or vibration values of the three linear axes in a table coordinate system defined on the table, a synthetic vector of the load current values or vibration values of the three linear axes for each said predetermined time on the basis of the load current values or vibration values stored for each said predetermined time,
changes, regarding the synthetic vector for each said predetermined time, display attributes, including color, thickness, and background color, according to (i) a size of the synthetic vector and (ii) a size of an angle formed by the synthetic vector and a previously acquired synthetic vector acquired prior to the synthetic vector,
generates, regarding the two rotational axes, a synthesized load value of the two rotational axes for each said predetermined time,
changes, regarding the synthesized load value for each said predetermined time, display attributes of circular arrows representing the load values of the two rotational axes according to a state of the synthesized load value, and
displays the tool trajectory of the tool center point and coordinate-system vectors representing the load values in the form of vectors.

2. The load display device according to claim 1, wherein the load display unit displays, along with the tool trajectory, the synthetic vector.

3. The load display device according to claim 1, wherein the tool trajectory display unit changes the color of the tool trajectory depending on the size of the load values.

4. The load display device according to claim 1, wherein the load display device is a display device of a numerical controller for controlling the multi-axis machine.

5. The load display device according to claim 1, wherein the load display device is a display device of a personal computer.

6. The load display device according to claim 1, wherein
the data acquisition unit acquires block numbers of a running program along with the machine coordinate values and load values for the three linear axes and the two rotational axes, and
the load display unit displays, along with the tool trajectory, the block numbers corresponding to the tool trajectory.

* * * * *